3,386,096
DIGITAL INSTRUMENTATION FOR OMNIRANGE
Michael W. Lundgreen, Cedar Rapids, John B. Majerus, Marion, and Melvin H. Rhodes, Cedar Rapids, Iowa, assignors to Collins Radio Company, Cedar Rapids, Iowa, a corporation of Iowa
Filed Apr. 14, 1967, Ser. No. 630,866
10 Claims. (Cl. 343—106)

ABSTRACT OF THE DISCLOSURE

This invention describes a circuit which provides aircraft bearing in digital output form from a VOR receiver. The circuitry called Digital Instrumentation for Omnirange interfaces at a point in the VOR receiver where filtered 30 Hz. FM channel and AM channel phase bearing signals are available. The difference in phase of the 30 Hz. signals is an indication of the aircraft bearing. The system utilizes two phase lock loops to generate signals that are input to a counter whereby digital readout in parallel form is provided as an indication of the phase difference between the FM channel and the AM channel and therefore is a direct indication of aircraft bearing. The interaction of the two phase lock loops results in a filtering of the digital output so that jitter in the least significant digit is less than the resolution of the system.

---

This invention relates generally to a system for providing a reading indicative of the bearing of an aircraft with respect to a homing station and particularly to a system for providing a bearing of an aircraft with respect to a homing station the output reading of which is in digital form.

The primary means by which aircraft traveling throughout the country are continually informed of their bearing is a system commonly called VHF Omnirange (VOR). The system employs a reference FM radio signal modulataed at 30 Hz. which is received by the aircraft. The VOR station also transmits a CW radio signal through a rotating directional antenna such that a 30 Hz. AM signal is provided in space at the receiving aircraft. The phase of the modulation of the FM signal is constant for all bearing angles relative to the station. However, the AM signal has a varying phase for each degree of bearing away from a reference bearing chosen for the station. The reference bearing is due North. An aircraft receiving both the AM and FM signals contains a phase detector which detects the phase difference between the 30 Hz. modulation carried by the AM and FM signals. This phase difference is measured in degrees and is a direct indication of the bearing of the aircraft relative to the reference phase of VOR station. These systems, as presently employed, utilize an analog output in the aircraft to indicate the bearing reading. These systems are quite satisfactory. However, the trend today in aircraft instrumentation is more toward the use of digital circuitry. There therefore exists a need for a system which provides aircraft bearing in digital form.

It is therefore an object of this invention to provide a system which yields the bearing of an aircraft operating with a VOR receiver in digital form.

It is another object of this invention to provide such a system which utilizes two phase lock loops.

It is another object of this invention to provide such a system in which one of the phase lock loops is locked to the modulation contained on the incoming FM signal and the other is locked to the modulation contained on the incoming AM signal with the difference in phase being measured by a digital counter.

It is another object of this invention to provide such a system in which the jitter of the readout is less than the resolution of the system.

Further objects, features, and advantages of the invention will become apparent from the following description and claims when read in view of the accompanying drawings wherein like numbers indicate like parts and in which:

Figure 1:
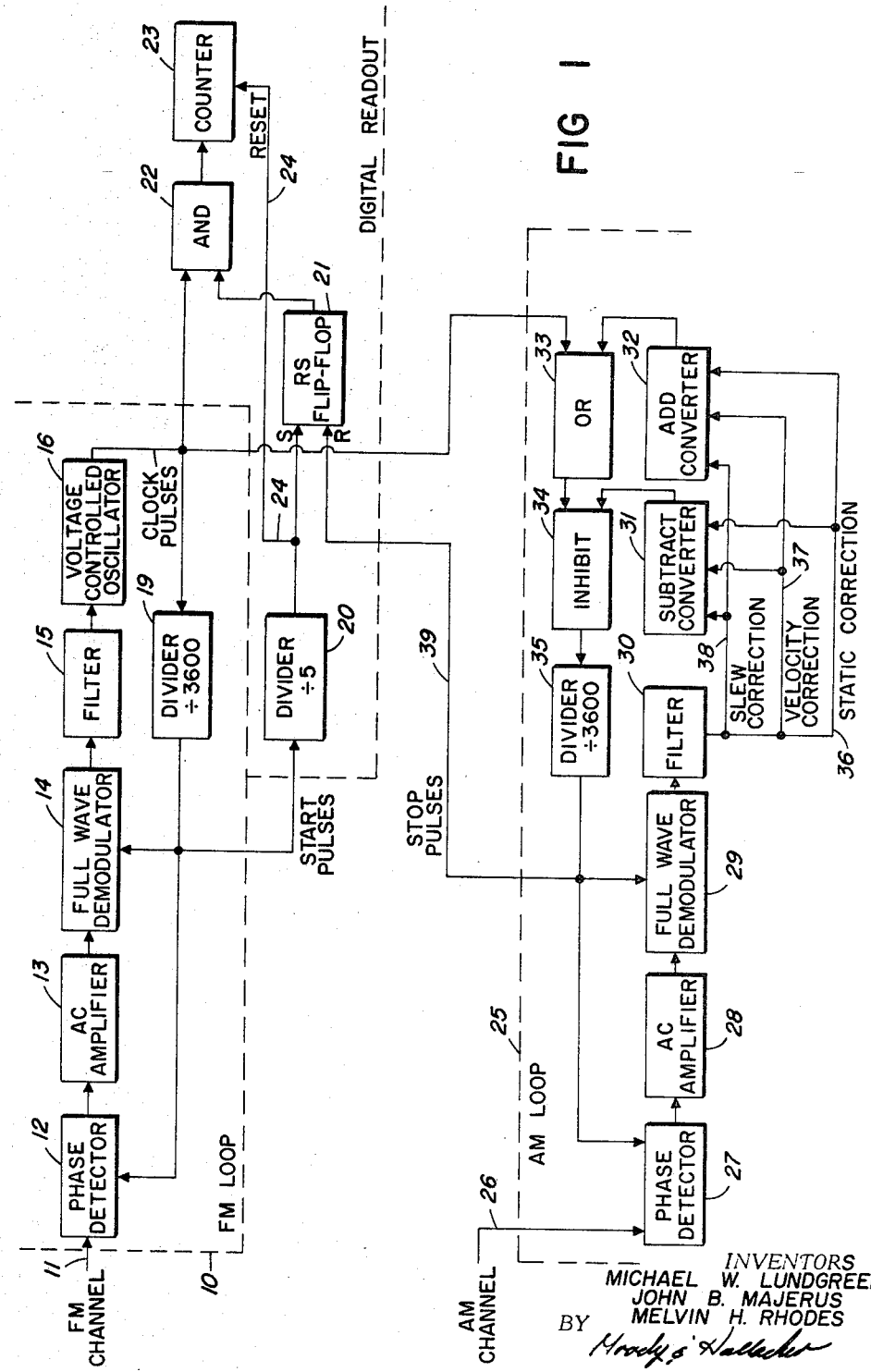
FIGURE 1 is a block diagram showing the two phase lock loops of the inventive system.

FIGURE 1 shows a FM Phase Lock Loop 10 which receives an input from the FM channel of a VOR receiver (Not shown). The input to FM Loop 10 is the demodulated FM 30 Hz. sinusoid from the FM channel of the VOR receiver, is received on an input lead 11 where it is received by a Phase Detector 12. The output of Phase Detector 12 is fed to a 108 kHz. Voltage Controlled Square Wave Oscillator 16 through an Amplifier 13, Full Wave Demodulator 14 and Filter 15. The output of VCO 16 is divided by 3600 in divider 19 to yield a 30 Hz. square wave which is fed to Phase Detector 12. The output of Phase Detector 12 is a voltage the level of which is proportional to the phase difference between the incoming sine wave and the 30 Hz. square wave input from Divider 19. This voltage is used to control VCO 16 to thereby phase lock VCO 16 with the incoming signal. The output of VCO 16 is also fed to one input of AND Gate 22. Divider 19 actuates a second Divider 20 which divides the 30 Hz. square wave by a factor of five to provide a 6 Hz. output. This output is fed to the Set Input of RS Flip-Flop 21 and also to the Reset terminal of Counter 23 via line 24.

Also shown in FIGURE 1 is a second Phase Lock Loop 25. Loop 25 receives the demodulated AM 30 Hz. signal from the VOR receiver on an input 26. This input is received by Phase Detector 27 the output of which is fed to a Filter 30 through an Amplifier 28 and a Full Wave Demodulator 29. Filter 30 feeds Converters 31 and 32 through Input Lines 36, 37, and 38. The outputs of Converters 31 and 32 actuate an inhibit circuit means composed of Inhibit 34 and OR gate 33. Subtract Converter 31 provides an input to Inhibit 34 and Add Converter 32 provides input to OR gate 33. The output of Inhibit 34 provides an input to a second 3600 Divider 35. The 108 kHz. output from VCO 16 is fed to the second input of OR GATE 33. The output of OR gate 33 is fed to Divider 35 through Inhibit 34. The output of Divider 35 therefore is a 30 Hz. square wave which is fed to Phase Detector 27 to thereby phase lock AM Loop 25 to the incoming AM signal received on Input 26. The output of Divider 35 is also fed to the Reset Input of Flip-Flop 21.

Operation

In operation the FM loop acts in the same manner as well-known phase lock loops.

The output of VCO 16 is directly applied to one input of AND Gate 22. However, no input is supplied to Counter 23 from AND 22 until the second input of AND 22 is also actuated. The output of VCO 16 is supplied to the Set Input of Flip-Flop 21 through Dividers 19 and 20. The Set Input of Flip-Flop 21 is therefore actuated at the rate of 6 Hz. per second. With an input signal on the Set Input of Flip-Flop 21 the second input to AND 22 is actuated and therefore clock pulses generated in the VCO 16 are fed to the Counter 23. Because the frequency of VCO 16 is 108 kHz. each pulse from VCO 16 is equivalent to 0.1° of phase difference in the two loops. The Counter 23 therefore continues to count until an input is received from AM loop 25 via line 39 to the Reset Input of Flip-Flop 21. Because a change of state of Flip-Flop 21 from Reset to Set can only occur by initiation from Divider 20 the Counter 23 stores the reading for a period of time equal to the pulse spacing from Divider 20. It should be noted that Counter 23 can be replaced by any digital readout means, the counter is merely an exemplary device.

AM Loop 25 also receives the clock pulses from VCO 16 at one input to OR Gate 33. These clock pulses are divided by 3600 in Divider 35. The square wave output of Divider 35 is phase locked to the incoming signal from the AM VOR channel by use of Phase Detector 27, Filter 30, Subtract Converter 31 and Add Converter 32. Filter 30 generates a voltage according to the phase error detected by Phase Detector 27. This voltage is fed to Converters 31 and 32 via lines 36, 37, and 38. Depending upon the magnitude and polarity of this voltage, pulses will be either added to the pulse train coming in from VCO 16 by Converter 32 or subtracted from the incoming pulse train by Converter 31. This addition or subtraction of pulses to the incoming pulse train results in a phase shift of the output pulse train on line 39 to thereby phase lock the pulse train on line 39 with the incoming 30 Hz. AM signal. The phase of the pulse train on line 39 therefore differs from the phase of the pulse train output from Divider 19 by the same number of degrees as the phase difference between the AM and FM incoming signals from the VOR receiver. The output of Divider 35 is fed to the Reset Input of Flip-Flop 21. Consequently the state of Flip-Flop 21 will change when the output of Divider 35 is received by Flip-Flop 21. Counter 23 therefore is actuated only during the time which is indicative of the phase difference between the square wave pulse trains. Because each pulse in the output of VCO 16 represents 0.1° the count available at Counter 23 is a direct reading of a phase difference between FM Loop 10 and AM Loop 25.

Figure 2:
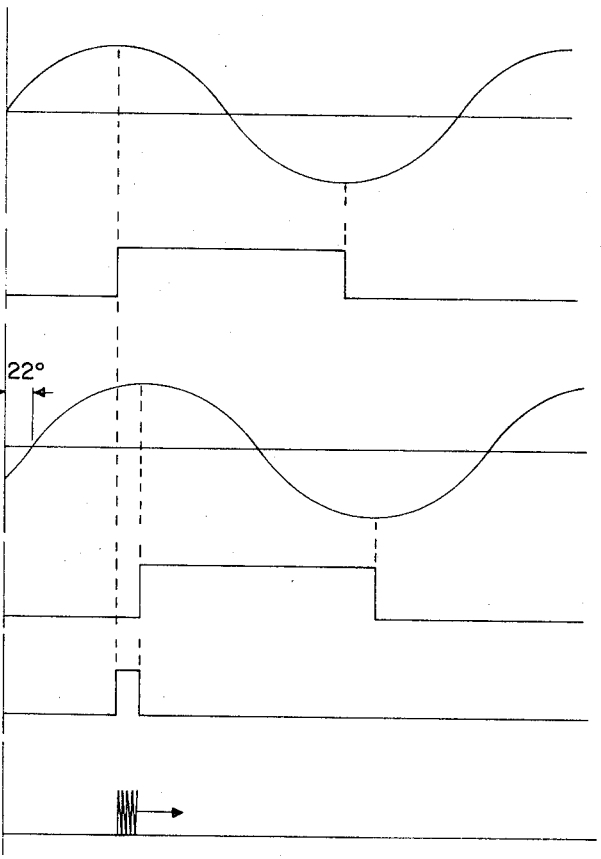
FIGURES 2a through 2f show the waveforms available at various points in the circuit and are useful in explaining the operation of the circuit.

The relationship of the signals available throughout the system can best be understood by viewing FIGURES 2a through 2f. FIGURE 2a represents the phase of the FM channel 10. FIGURE 2a is the reference phase. With the Loop 10 phase locked the 30 Hz. input to Phase Detector 12 is the square wave shown in FIGURE 2b. FIGURE 2c shows the AM input signal to AM Loop 25 which, in the example chosen, is 22° out of phase with the FM channel. With the AM Loop phase locked the square wave shown in FIGURE 2d is exactly in phase with the AM signal of FIGURE 2c. FIGURE 2e shows the difference in phase between the FM Loop and AM Loop square waves. This is the 22° period for which the Set Input of Flip-Flop 21 is actuated. This is so because the rise side of the FM square wave of FIGURE 2b actuates the Set Input of Flip-Flop 21 which remains actuated until the rise side of the AM square wave of FIGURE 2d actuates the Reset Input of Flip-Flop 21. The second input to AND 22 can therefore be viewed as receiving the 22° square wave pulse shown in FIGURE 2e. While this pulse is present on the input to AND 22 the 0.1° clock pulses from VCO 16 are fed through AND 22 to Counter 23. The output of Counter 23 is therefore indicative of the phase difference between the FM and AM sine waves shown in FIGURES 2a and 2c respectively, in 0.1° increments.

Figure 3:
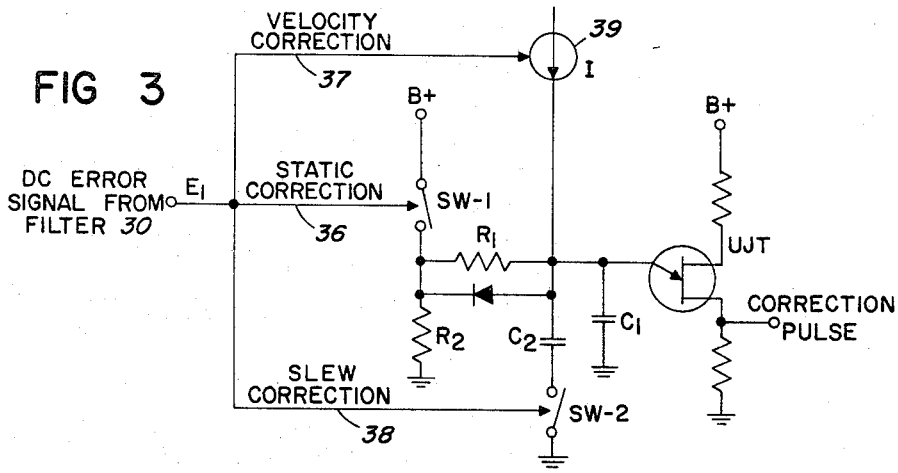
FIGURE 3 shows the converter used in the phase lock loop.

The Converter shown in FIGURE 3 represents either the Add Converter 31 or Subtract Converter 32. The circuit is a well-known unijunction transistor (UJT) oscillator arranged with three inputs to control output pulse rate. SW-1 and SW-2 are simplified representations of the actual solid state implementation. When the aircraft is flying along a VOR radial and the deviations are small, the static correction input maintains the null at the ouput of phase detector 27 in the AM loop. SW-2 is closed and the current I from the Current Generator 39 is zero. SW-1 operates from the DC error signal with essentially zero dead zone. The Add Converter 32 responds to one polarity of error signal; the Subtract Converter 31 responds to the opposite polarity. As the error signal dithers about zero, SW-1 is in transition. Capacitors $C_1$ and $C_2$ charge toward +18 volts through $R_1$ with a time constant of approximately two seconds and discharge through $R_2$ with a shorter time constant of approximately 0.1 second. When the capacitor voltage reaches 11 volts (1 time constant), the UJT fires and one pulse is generated. The capacitors are discharged by the UJT following the pulse generation and another pulse is generated when the capacitors once more charge to 11 volts. The unequal charge-discharge time constant biases the generator such that a steady error signal is required to generate a correction pulse and small random error signals do not tend to cause jitter of the indication.

If the bearing of the aircraft is changing, the velocity correction aids the static correction in maintaining the AM loop at null. The current generator 39 supplies a charging current, I, to $C_1$ and $C_2$ in proportion to the magnitude of error. Thus, with the charging rate of $C_1$ and $C_2$ being proportional to I, the pulse rate from the converter varies with the magnitude of error. UJT parameters limit the correction rate to 6 degrees per second. Indicator jitter around the null due to the action of the velocity correction is minimized by providing a 0.5 degree threshold below which the velocity correction is inactive. Under a condition of a changing bearing, when the static correction may operate to slowly, the velocity correction can maintain tracking with reasonable rates of change of bearing.

Figure 4:
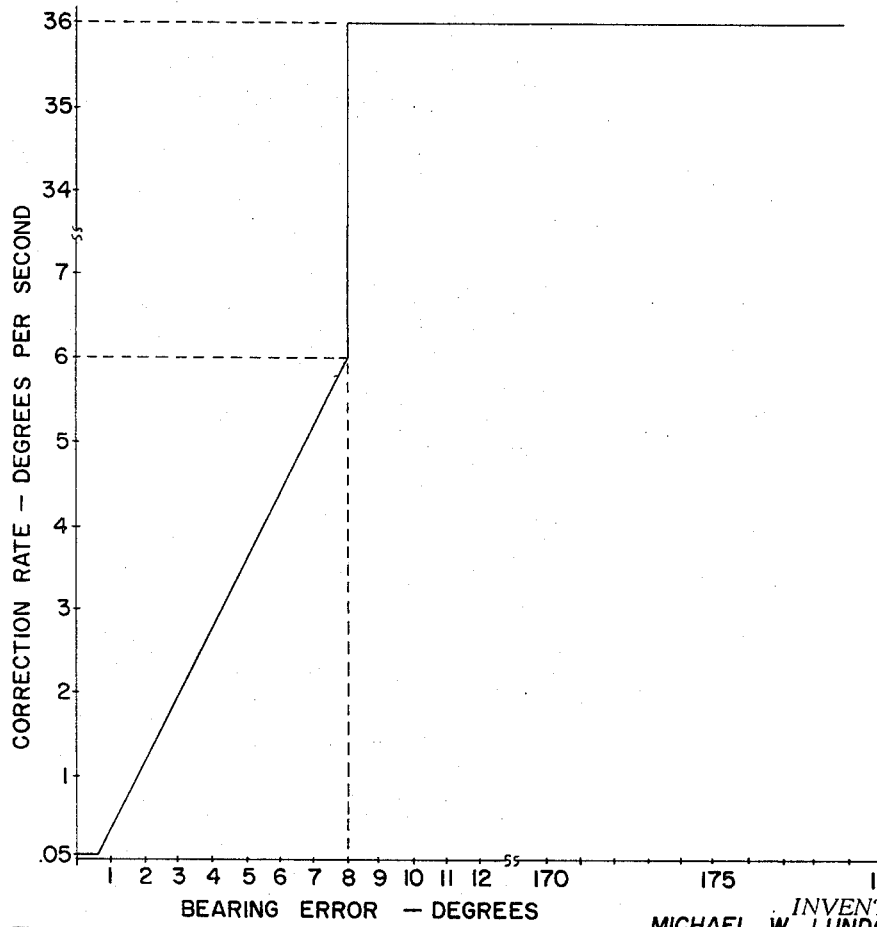
FIGURE 4 is a graph showing the correction rate in degrees per second versus bearing error in degrees.

When the VOR is initially turned on or initially receives a VOR signal, the indicated bearing can be in error as much as 180 degrees. Action of the velocity correction (6°/sec. max.) is too slow in that in excess of 30 seconds would be required to null. The slew correction is a gross contributor to the correction process. Errors exceeding eight degrees open SW-2. The charging capacity is reduced six times because of the removal of $C_2$ from the charging network, the ratio of capacitance in capacitors $C_1$ and $C_2$ is 5/1. Consequently the velocity correction provides a correction rate of 36 degrees per second for a bearing error greater than eight degrees. Maximum acquisition time is then reduced to a more acceptable value in the range of 7 seconds. The curve shown in FIGURE 4 shows the correction rate as a function of bearing error.

Although this invention has been described with respect to a particular embodiment thereof and for illustration using particular values of frequencies, dividing factors and other illustrative values, it is not to be so limited, as changes and modifications may be made therein which are within the spirit and scope of the invention as defined by the appended claims.

We claim:
1. A system for providing the bearing of an aircraft in digital form comprising: first means for receiving a first sinusoidal signal; second means for receiving a second sinusoidal signal; the phase relationship of said first and second signals varying according to the bearing of said aircraft; said first means for receiving including a first phase lock loop, said second means for receiving including a second phase lock loop; a square wave generator; an output of said square wave generator actuating said first phase lock loop so that said first loop is phase locked to said generator; said second phase lock loop including means for changing the phase of a square wave signal; a second output of said square wave generator actuating said phase changing means so that the output of said phase changing means is phase locked to said second signal; logic circuit means including a digital readout means; said logic circuit means receiving the outputs of said first and second phase lock loops and said generator so that the output of said readout means is an indication of the phase difference between said first and second sinusoidal signals.

2. The system of claim 1 wherein said first phase lock loop is a FM loop and said second phase lock loop is an AM loop.

3. The system of claim 2 wherein said first phase lock loop includes a first divider and a first phase detector; said first divider receiving the output of said generator and dividing the output thereof so that frequencies of said square wave and said first sinusoidal signal are similar; said first phase detector receiving said first divider output and first sinusoidal signal to generate a first control voltage proportional to the difference in phase of the two inputs; said control voltage controlling said square wave generator so that the output of said generator applied to said first divider produces an output from said first divider that is phase locked to said first sinusoidal signal; said second phase lock loop includes a second divider and a second phase detector; said second divider receiving the output of said square wave generator through said means for changing the phase of said square waves; said second phase detector receives said second sinusoidal signal and the output of said second divider to generate a second control voltage; said second control voltage actuating said means for changing the phase of said square wave so that said second sinusoidal signal and the output of said second divider are phase locked; said means for changing the phase of said square wave includes a filter; a subtract converter; an add converter; and an inhibit circuit means including an OR gate; said filter receiving said second control voltage to generate a phase control signal the polarity and magnitude of said control signal depending upon the phase relationship of said second sinusoidal signal and said second divider output; said control signal actuating said subtract converter for one polarity of signal and said add converter for the other polarity of signal, said inhibit circuit means receiving the outputs of said add converter and said subtract converter to actuate said second divider; said logic circuit means includes a two input bistable circuit, said bistable circuit receiving the output of said first phase lock loop on one input terminal and the output of said second phase lock loop on the other input terminal; an AND gate receiving the outputs of said bistable circuit and said square wave generator; said digital readout means receiving the output of said AND gate.

4. The system of claim 1 wherein said first phase lock loop includes a first divider and a first phase detector; said first divider receiving the output of said generator and dividing the output thereof so that the frequencies of said square wave and said first sinusoidal signal are similar; said first phase detetector receiving said first divider output and first sinusoidal signal to generate a first control voltage proportional to the difference in phase of the two inputs; said control voltage controlling said square wave generator so that the output of said generator applied to said first divider produces an output from said first divider that is phase locked to said first sinusoidal signal; said second phase lock loop includes a second divider; a second phase detector; said second divider receiving the output of said square wave generator through said means for changing the phase of said square wave; said second phase detector receives said second sinusoidal signal and the output of said second divider to generate a second control voltage; said second control voltage actuating said means for changing the phase of said square wave so that said second sinusoidal signal and the output of said second divider are phase locked.

5. The system of clam 4 wherein said means for changing the phase of said square wave includes a filter; a subtract converter; an add converter; and an inhibit circuit means; said filter receiving said second control voltage to generate a phase control signal, the polarity and magnitude of said control signal depending upon the phase relationship of said second sinusoidal signal and said second divider output; said control signal actuating said subtract converter for one polarity of signal and said add converter for the other polarity of signal, said inhibit circuit means receiving the outputs of said add converter and said subtract converter to actuate said second divider.

6. The system of claim 5 wherein said logic circuit means includes a two input bistable circuit, said bistable circuit receiving the output of said first phase lock loop on one input terminal and the output of said second phase lock loop on the other input terminal; an AND gate receiving the outputs of said bistable circuit and said square wave generator; said digital readout means receiving the output of said AND gate.

7. The system of claim 6 wherein said bistable circuit is a Set-Reset Flip-Flop; and wherein said one input is the Set input of said Flip-Flop and said other input is the Reset input of said Flip-Flop.

8. The system of claim 6 including a third divider; said third divider receiving the output of said first divider; the output of said third divider actuating said one input terminal of bistable circuit.

9. The system of claim 8 wherein said bistable circuit is a Set-Reset Flip-Flop; and wherein said one input is the Set input of said Flip-Flop and said other input is the Reset input of said Flip-Flop.

10. The system of claim 4 wherein said add converter changes the phase of said square wave by injecting a pulse between pulses of said square wave and said subtract converter changes the phase of said square wave by injecting a pulse which cancels a pulse of said square wave.

References Cited

UNITED STATES PATENTS

| | | | |
|---|---|---|---|
| 3,200,340 | 8/1965 | Dunne | 324—83 |
| 3,209,254 | 9/1965 | Hossmann | 324—83 |
| 3,332,080 | 7/1967 | Verwey | 343—106 |
| 3,349,401 | 10/1967 | Kennedy et al. | 343—106 |

RICHARD A. FARLEY, *Primary Examiner.*

H. C. WAMSLEY, *Assistant Examiner.*